United States Patent [19]

Weiner et al.

[11] 4,091,451

[45] May 23, 1978

[54] METHOD OF AND APPARATUS FOR MAKING UP A THREADED CONNECTION

[75] Inventors: Peter D. Weiner, Woodlands; Charles W. Calhoun, Houston; Jerry A. Collins, Houston; Gary Lynn Mee, Houston, all of Tex.

[73] Assignee: Weatherford/Lamb, Inc., Houston, Tex.

[21] Appl. No.: 791,113

[22] Filed: Apr. 26, 1977

[51] Int. Cl.² .......................... G01L 5/24; G06F 9/16
[52] U.S. Cl. .................................... 364/506; 173/12; 73/139
[58] Field of Search ....................... 364/506, 508, 464; 173/12; 73/136 R, 139; 29/407

[56] References Cited

U.S. PATENT DOCUMENTS

| 3,606,664 | 9/1971 | Weiner | 73/139 X |
| 3,745,820 | 7/1973 | Weiner | 173/12 X |
| 3,888,116 | 6/1975 | Spinella | 73/136 A |
| 3,905,427 | 9/1975 | Kenney | 173/12 |
| 3,974,685 | 8/1976 | Walker | 173/12 X |
| 3,975,954 | 8/1976 | Barnich | 73/139 |
| 3,982,419 | 9/1976 | Boys | 173/12 |
| 4,008,773 | 2/1977 | Wallace | 173/12 |
| 4,026,369 | 5/1977 | Vliet | 173/12 |

*Primary Examiner*—Edward J. Wise
*Attorney, Agent, or Firm*—Fulbright & Jaworski

[57] ABSTRACT

A method of and apparatus for making up two members having mating threaded connections, such as pipe joints or bolts, for insuring that a specified number of threads have been engaged and a specific torque has been applied. The mating threaded connections are threadably engaged while measurements are made of the torque required to turn one of the members relative to the other, and measurements are made of the number of turns of the members relative to each other. In order to insure that a bad joint is not made up, the measurements of torque and turns must remain within specified parameters or the threaded interconnection is discontinued. The method and apparatus further includes avoiding erroneous turn measurements that may occur such as due to bending or swaying of one of the members during makeup.

7 Claims, 5 Drawing Figures

PARAMETER CONTROL

METHOD OF AND APPARATUS FOR MAKING UP A THREADED CONNECTION

BACKGROUND OF THE INVENTION

It is well known that in order to satisfactorily make up a threaded connection between two members having mating threads, such as oil field tubing and casing joints or bolts, that a specified number of threads have to be engaged and a specific torque applied, particularly in the case of tubular goods which are required to be leak proof. Prior U.S. Pat. Nos. 3,368,396; 3,606,664; 3,745,820 illustrate apparatus for measuring torque and counting the number of turns a threaded connection is engaged. However, the prior art devices only indicate that a "bad joint" has been made up when certain predetermined conditions are found to exist. It is desired that failure in a made-up joint be predicted and detected as soon as possible so that additional damage to the threads does not occur and also to avoid the continual application of torque to defective joints because it is very difficult and time-consuming to uncouple defective threaded connections.

Generally, when a threaded connection begins to interengage, more torque is required to rotate one of the members relative to the other member. When the applied torque reaches a predetermined point, it is referred to as reference torque and is the starting point for counting the number of turns of one member relative to the other for measuring engagement of the threads. However, it has been found that during actual makeup of the threaded connection, bending of one of the threaded members relative to the other threaded member, such as occurs on a drilling rig when rotating pipe sways, creates a false indication of reference torque during initial makeup before proper actual thread makeup is started. With the prior art devices, any time torque was exceeded, turn counts were measured with the counts discontinuing when torque fell below reference torque. The false turns were included as a portion of the final turns producing an error that resulted in insufficient actual thread makeup. However, the present invention overcomes the problem of erroneous turn count by utilizing the fact that when the torque drops below reference torque the turns introduced, while the torque, was above reference torque are removed. When torque is maintained above reference torque number of turns are accumulated.

SUMMARY

The present invention is directed to a method of and apparatus for making up a threaded connection of two members having mating threads by monitoring the makeup as it proceeds and predicting failure of the joint before the end point of the makeup is reached thereby avoiding damage to the threaded connection. The threaded turns and the applied torque are continuously measured during the makeup and if the torque/turn relationship does not proceed within certain specified parameters, the makeup is discontinued.

A further object of the present invention is the provision of a method and apparatus for avoiding erroneous measurement of turns of the makeup of the mating threads by counting the turns if the measured torque exceeds a reference torque value, but if the measured torque drops below the reference torque, then all measured turns accumulated are automatically erased and when the torque again exceeds the reference torque value, a new measurement of turns will be made. This particular feature will avoid errors in turn counts caused by deflection of one of the threaded members relative to the other threaded member during initial makeup.

Yet a still further object of the present invention is the provision of a method of and an apparatus for making up two members having mating threads by threadably interengaging said mating threads while measuring the torque required to turn one of the members relative to the other member until a predetermined reference torque is reached. Thereafter further threadably interengaging the mating threads and counting the number of turns of one member relative to the other while continuing to measure the torque, but discontinuing the further threaded interengagement of the mating threads when the torque required to further threadably engage the mating threads is greater than $$N \left( \frac{\text{a predetermined maximum torque} - \text{reference torque}}{\text{predetermined minimum turns}} \right) + \text{reference torque}$$

or is less than $$N \left( \frac{\text{a predetermined minimum torque} - \text{reference torque}}{\text{predetermined maximum turns}} \right) + \text{reference torque}$$

where $N$ is the number of threaded turns.

Still a further object is the provision of a method and apparatus of continuously monitoring the makeup of a threaded connection from the reference torque point to the end of a successful makeup, but stopping the progress of the makeup anytime the relationship between the measured torque and measured turns exceeds predetermined values.

Other and further objects, features and advantages will be apparent from the following description of a presently preferred embodiment of the invention, given for the purpose of disclosure and taken in conjunction with the accompanying drawings.

DESCRIPTION OF THE PREFERRED EMBODIMENT

Figure 1:
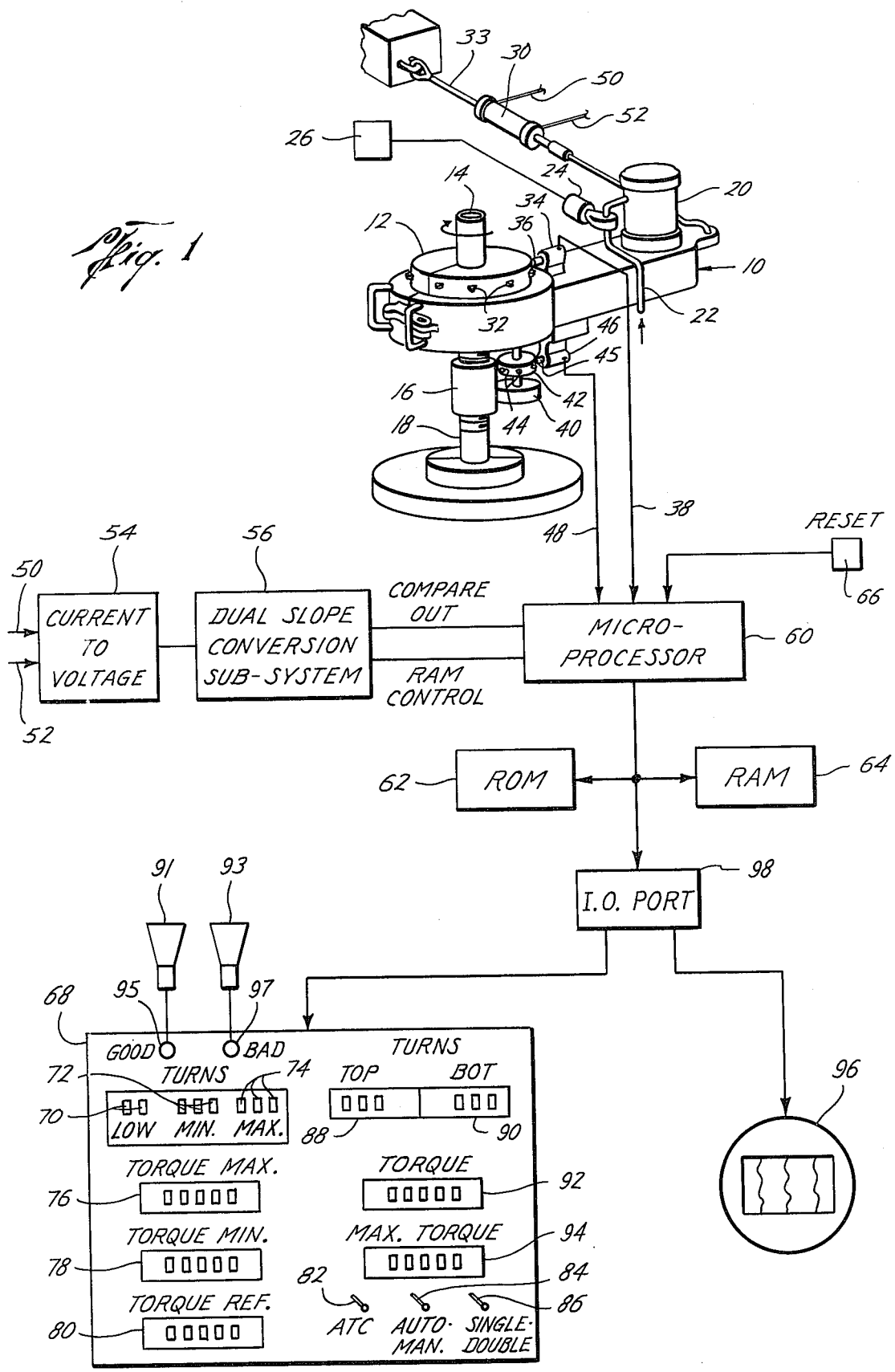
FIG. 1 is a schematic diagram of the preferred embodiment of the invention.

While the present invention is applicable to making up threaded connections such as bolt and stud connections, for purposes of illustration only, it will be described in connection with joining one length of tubular goods, such as a well pipe, to another.

Referring now to the drawings, power tongs, generally indicated by the reference numeral 10, include a rotatable jaw member 12 for gripping and rotating a well pipe string section, such as pipe section 14. The lower end of pipe section 14 is shown being threaded into a pipe coupling 16 to which is also threaded the upper end of a second pipe section 18. A tong prime mover 20, such as a hydraulic motor, is connected to the rotatable jaw member 12 by a drive mechanism (not shown) in a conventional manner. A supply line 22, provided with a valve 24, is connected to the hydraulic motor 20 for supplying actuating power to the motor 24. An energizing relay 26 actuates the valve 24. Any suitable apparatus for measuring the torque exerted by the rotary jaw member 12 on the well pipe 14 may be utilized. For example, an electric strain gauge 30 may be incorporated in a backup line 33 connected to the power tongs 10 which provide an electrical signal indicative of the torque exerted by the rotary jaw member 12, which torque is proportional to the strain in the backup line 33.

Suitable means are provided for measuring the rotation of the rotatable jaw member 12 and thus of the pipe section 14. For example, the rotary jaw member 14 may be provided with a number of lugs or projections 32 which in turn actuates a microswitch 34 having an actuating arm 36 so that the projections 32 will successfully engage actuating arm 36 to momentarily close microswitch 34 as the rotatable jaw member 12 is driven by the motor 20. The result is that a series of pulses or counts will be transmitted through line 38. Therefore, the thread makeup of the pipe section 14 relative to the coupling 16 (if the coupling is stationary) may be measured by counting the number of switch closures as the pipe 14 rotates. Normally, the lugs 32 actuate the switch 34 ten times per one revolution of the pipe 14.

Of course, if the coupling 16 is already tightly threaded to the pipe section 18, then the only concern is to make up a satisfactory fluid-tight joint between the pipe section 14 and the coupling 16. However, if the coupling 16 is merely floated onto the pipe section 18, then the power tongs 10 will provide a double end makeup. That is, the tongs 10 will make up the threaded connection between the pipe 14 and coupling 16 as well as between the coupling 16 and the pipe section 18. In the case of a double end makeup, the number of turns of rotation of the pipe coupling 16 must also be measured. For example, a bottom wheel 40 is provided which frictionally engages and rides on the outer surface of the coupling 16 whereby the rotation of the coupling 16 causes wheel 40 and a connecting actuator wheel 42 mounted on a common shaft with the wheel 40 to rotate. A number of lugs or projections 44 are provided on the actuator wheel 42 so as to engage actuating arm 45 of a second microswitch 46. Microswitch 46 provides a series of pulses or counts to line 48 to provide an indication of the rotation turns of coupling 16.

The output from the strain gauge 30, which is a measure of the torque applied by the tongs 10 to the pipe section 14 is measured by lines 50 and 52, converted to voltage in converter 54, transmitted to a slope conversion subsystem 56 and further transmitted to the microprocessor 60 which includes a ROM 62 (read only memory) and a RAM 64 (random access memory).

The turns count of the top pipe section 14 is transmitted over line 38 to the microprocessor 60 and the turns count of the bottom coupling member 16 is transmitted over line 48 to the microprocessor 60. A reset switch 66 is provided to reset the system prior to threadably connecting each pair of threaded connections.

A control panel 68 is provided on which various values are preset, depending upon the type of makeup being connected such as specific size, weight, grade and type of pipe connection. Thumbwheel switches 70, 72 and 74 are provided for setting in the values of low turns, minimum turns, and maximum turns, respectively. Thumbwheel switches 76, 78 and 80 are provided for inserting values of maximum torque, minimum torque and reference torque into the system. Various manually actuated switches, which will be described in greater detail, such as an automatic turn correction switch 82, an automatic-manual switch 84, and a single-double makeup switch 86 are provided to set the mode of operation of the system.

Various displays are provided to provide the operator with instantaneous values concerning the number of turns and applied torque as the makeup progresses. Thus, display 88 provides a readout of the turns of top member 14, display 90 provides a readout of the number of turns of the bottom member 16, display 92 provides a readout of the torque applied by the power tongs 10, and readout 94 provides a hold readout indicating the maximum torque applied by the tongs 10 to a makeup. A recorder 96 is provided which may be a strip chart device for recording both the applied torque in turns and the values set into the system thereby providing a record of the makeup of each joint. The inlet-outlet port 98 provides an interface between the processor 60 and the control panel 68 and recorder 96. Indicator lights 95 and 97 indicate whether the joint being made up is good or bad, respectively, and a horn 91 and a siren 93 are provided to give an audible signal of whether a makeup is good or bad, respectively.

Figure 2:
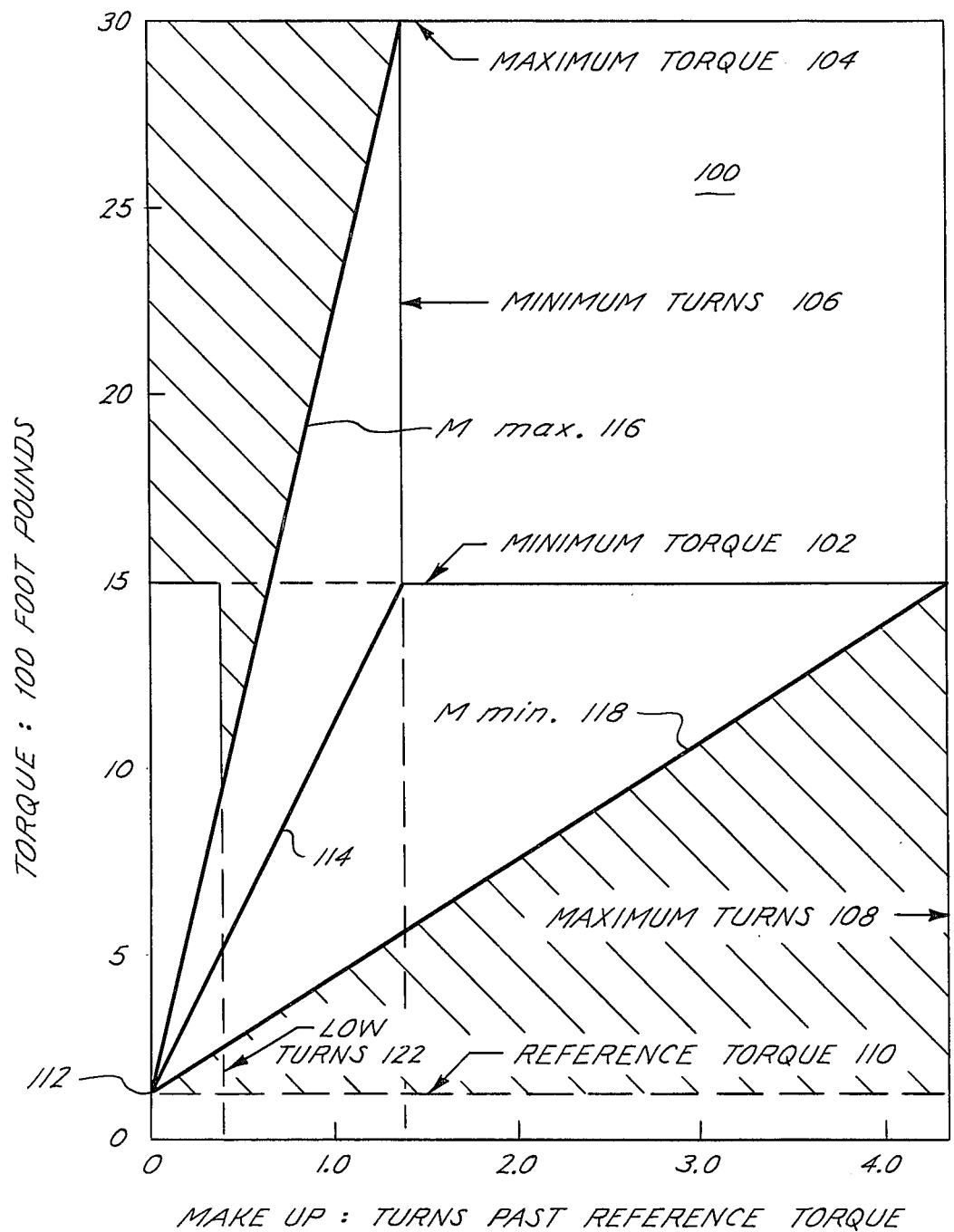
FIG. 2 is a chart illustrating the relationships between torque and turns in making up a threaded connection, and FIGS. 3A, 3B and 3C taken together are the program of the processor of the present invention.

It is generally known that if a specified number of threads is engaged and a specified torque is applied, together with proper cleaning and application of specific pipe dope compounds, then a threaded connection will be leak proof. Referring now to FIG. 2, a chart is shown of torque versus applied turns for a particular pipe, namely, 4½ inch API-NU, 12.6 pounds, grade J-55 casing. If the measured torque and measured turns fall within the square 100 at the end of a makeup, then the connection is generally considered a good joint. The square 100 is bounded by a minimum torque rating 102, a maximum torque rating 104, a minimum turn 106 and a maximum turn 108. However, if the torque and turn measurement fall outside of the square 100 at the end of the makeup, then the threaded connection is considered a bad joint.

As one member of a threaded connection is being made up, that is, connecting one member to another member, one member such as pipe section 14 is rotated relative to the other member such as coupling 16. As the coacting threads between pipe section 14 and coupling 16 begin to engage, more torque is required to rotate the pipe 14. When the applied torque reaches a predetermined point, it is referred to as reference torque 110 and is the starting point for beginning the measurement of the turn counts of the rotation of the pipe. When a threaded connection is being made up, there are relationships that exist between the applied torque, and the number of threads being engaged. If proper doping procedure is used, then the relationship between the applied torque and the turns being engaged is predictable (assuming that the threads are not damaged) from the reference torque point 112 to a seal tight point, the end of a successful makeup, in the good joint area 100. In the past, no consideration was given to this relationship until the end point of makeup was reached, and, at that point, the threaded connection would be determined to be either a good joint or a bad joint. For example, it would be considered a bad joint if the torque was excessive with insufficient threads engaged or if an excessive number of turns were applied.

If the makeup process continues along the line 114 with the torque/turns relationship indicated, this would indicate an ideal type makeup and a good joint.

However, it is desirous that any prospective failure mode be detected as soon as possible so that additional damage to the coupling 16 or pipes 14 or 18 would not occur. As an example, if the coupling 16 contains a defective thread, then a continued application of torque could cause damage to the coacting threads. Another disadvantage to continued application of torque is, that excessive damage to the threads makes it very difficult and time-consuming to uncouple the defective components, resulting in lost time.

The present invention is directed to a method and apparatus whereby the turns count is compared to the applied measured torque as soon as the reference torque 110 occurs, and the results during the continued makeup of the threaded connection must be within certain specified parameters or the makeup is discontinued. That is, the present apparatus and method is directed to predicting the occurrence of a bad joint without waiting until the end of the joint makeup.

The parameter control portion of this invention relates to maximum and minimum slopes established. During makeup, the actual slope of torque/turns must continually stay within the boundaries or it is predicted either a mechanical or leakage problem will be encountered.

Referring to FIG. 2, the maximum allowable slope 116 is designated "M. max." and reflects equation 1. The minimum slope 118 is labeled "M. min." and reflects equation 2.

$$M \text{ max.} = \frac{\text{Max. torque set} - \text{Ref. torque set}}{\text{Min. Turns Set}} \quad \text{(Equation 1)}$$

$$M \text{ min.} = \frac{\text{Min. torque set} - \text{Ref. torque set}}{\text{Max. Turns Set}} \quad \text{(Equation 2)}$$

where:
- Min. Torque Set = Value derived by certain stress calculations, and proven in field test, for each grade, type and size of pipe.
- Max. Torque Set = 120 – 200% Min. Torque Set
- Ref. Torque Set = 10% Min. Torque Set (hand tight)
- Min. Turns Set = Value derived by certain stress calculations and proven in field test, for each grade, type and size of pipe.
- Max. Turn Set = 120 – 200% of Min. Turns Set
- Low Turns Set = 25% of Min. Turns Set It should be noted that variable percentages of minimum torque can be used as well as variable percentages of minimum turns can be used for the other set points.

The three torque settings (reference torque 120, minimum torque 102, and maximum torque 104), and the three turns settings (low turns 122, minimum turns 106, and maximum turns 108) are entered by the operator into digital thumbwheel switches 80, 78, 76, 70, 72 and 74, respectively, located on the control panel 68 (FIG. 1). The "set" values are supplied to the operator in booklet form for each type, grade and size of pipe.

When the processor 60 is energized, the set points are introduced to the electric circuits, and the value of "M min." and "M max." are placed in memory.

When makeup commences and threads are engaged, torque requirements increase until strain gauge 30 detects a "hand tight" condition (reference torque 110).

When reference torque point 112 is reached, count pulses normally representing 0.1 or 0.01% of a turn per pulse are introduced into the processor 60, or other factors of a turn can be used dependent upon the count pickup means. When an amount of pulses representing "low turns" 106 is reached, all parameter circuits are energized, and two equations are calculated.

High Acceptance (HA) = N(M. max.) + Ref. Torque

Low Acceptance (LA) = N(M. min.) + Ref. Torque

Actual Value (AV) = Torque where:
- N = No. of Turns in 0.1 or 0.01 turns increments (or other incremental turns used)
- Torque = Measured torque, in ft. lbs.

If AV is less than HA, and greater than LA, then the joint is forecast to be a good joint. However, if AV is greater than HA, or less than LA, the joint is forecast to be a bad joint.

Certain defects can exist before the low turns point is reached. Defective threads can cause excessive torque before low turns are reached. In this case, if min. torque 102 is reached before low turns 122, then the joint is forecast to be a bad joint.

To better understand this invention, assume a type and grade of pipe is selected. The torque and turns settings for producing a leak proof connection are furnished.

Pipe—4½ inch API-NU, 12.6 LBS., Grade J - 55 Casing

The Data Book Shows
- Min. Torque Set = 1500 ft. lbs.
- Min. Turns Set = 1.4 Turns
- Ref. Torque Set = 150 ft. lbs.
- Max. Torque Set = 3000 ft. lbs.
- Max. Turns Set = 4.2 Turns
- Low Turns Set = 0.4 Turns The above set points are entered via thumbwheel switches 70, 72, 74, 76, 78 and 80 into the control panel 68.

The processor 60 is energized, makeup commences and the threads are engaged. Assume reference torque 110 is reached, and the count pulses starts. When the turns count reaches low turns 122 set (in this case 0.4 turns) assume torque = 540 ft. lbs. This torque value is then electronically compared to HA:

$$HA = N(M. \text{ max.}) + \text{Ref. torque}$$
$$= .4\left(\frac{\text{Max. torque set} - \text{Ref. toruqe}}{\text{Min. Turns set}}\right) + \text{Ref. torque}$$
$$= .4\left(\frac{3000 - 150}{1.4}\right) + 150$$
$$= .4(2035) + 150$$
$$= 814 + 150$$
$$= 964$$

Since the torque (AV) = 540 the M. max. has not been exceeded.

Compare AV to LA $$LA = N(M \text{ min.}) + \text{Ref. torque}$$
$$= .4\left(\frac{\text{Min. torque set} - \text{Ref. torque}}{\text{Max. turns set}}\right) + \text{Ref. torque}$$
$$= .4\left(\frac{1500 - 150}{4.2}\right) + 150$$
$$= .4(321) + 150$$
$$= 278$$

Since AV = 540, then M. min. has not been exceeded.

The makeup is proceeding within the max. and min. boundaries, and is predicted to be a successful makeup.

If the torque value at 0.4 turn was 1100 ft. lbs., the M. max. 116 would be exceeded. If the torque value at 0.4 turns was 220 ft. lbs., then M. min. 118 would be exceeded, and in both cases, a bad joint alarm would be activated.

By referring to FIG. 2, it may be seen that as long as the torque value stays within the Max./Min. values 116 and 118, the end result will be a successful connection.

However, in prior art systems, it has been found that during actual makeup of the pipe section 14 to a pipe coupling 16, swaying of the rotating pipe section 14 created false indications of torque during initial makeup, and reference torque was reached before actual thread makeup was started. It was also noted that the reference torque, which was erroneously surpassed, dropped below reference torque in unison with the sway. Therefore, by measuring the turn counts based upon when reference torque was exceeded, an error was produced in measuring a turn count and sufficient thread makeup was not reached. Another feature of the present invention is the provision of automatic means to remove false turn counts. Therefore, the microprocessor 60 monitors the turns input signals, and if the measured torque exceeds the reference torque, it allows the turn count pulses to be accepted. However, if the measured torque drops below the reference torque 110 anytime, for any reason, before the minimum torque 102 point is reached, then all of the turn counts accumulated are automatically erased from the storage bank. When the measured torque again exceeds the reference torque 110, new turn counts will be received.

Figure 3A:
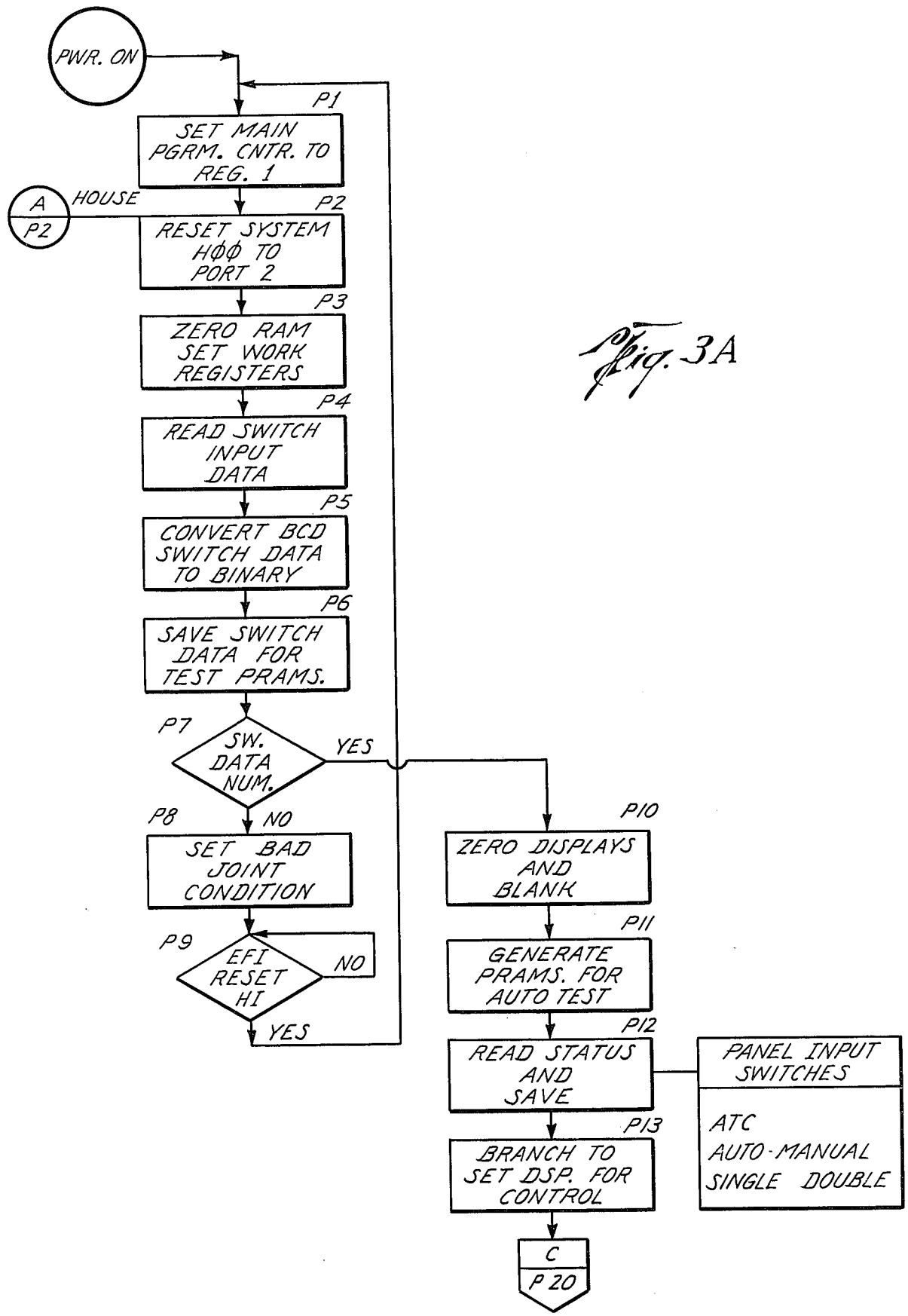
Figure 3B:
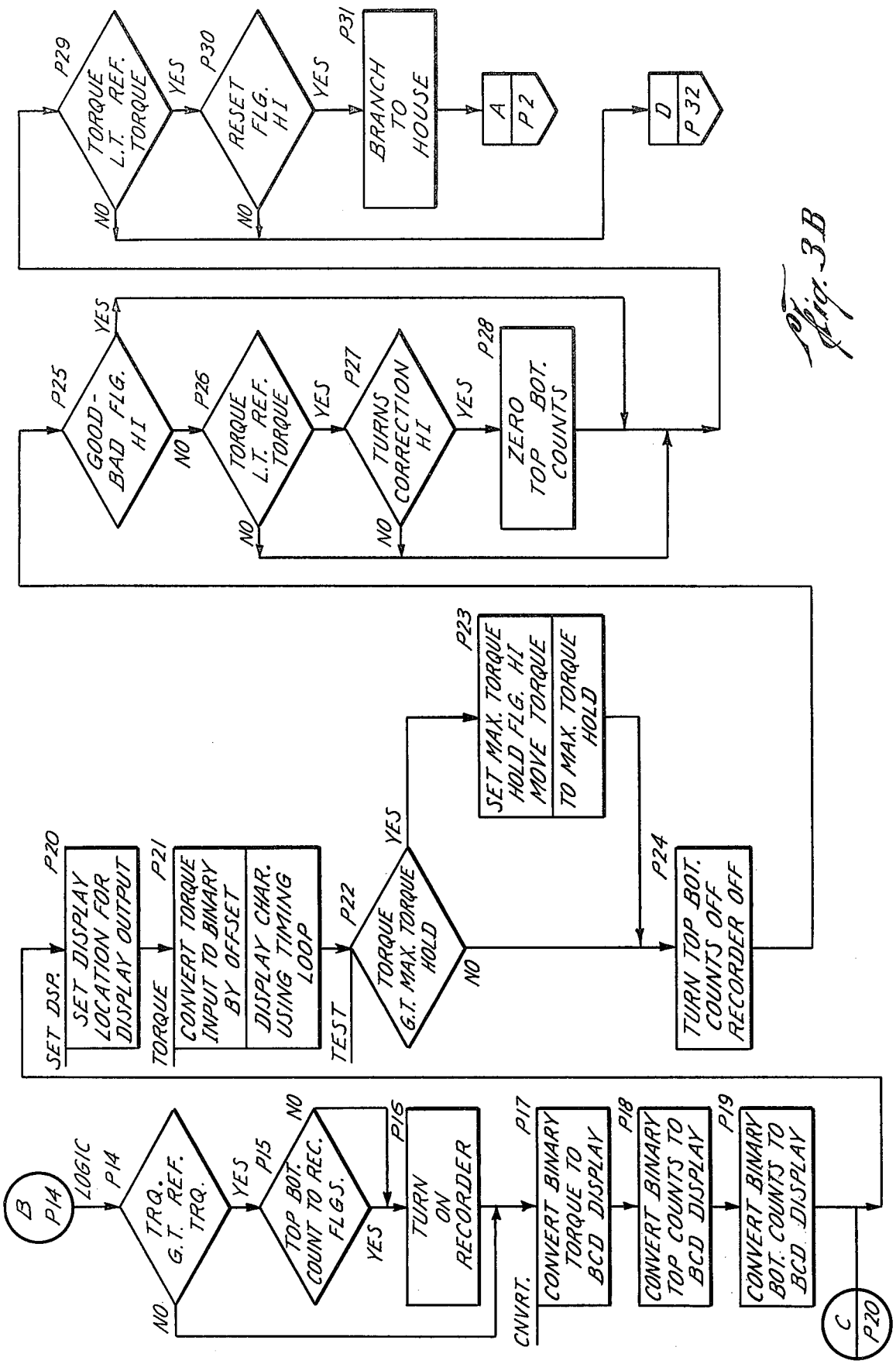
Figure 3C:
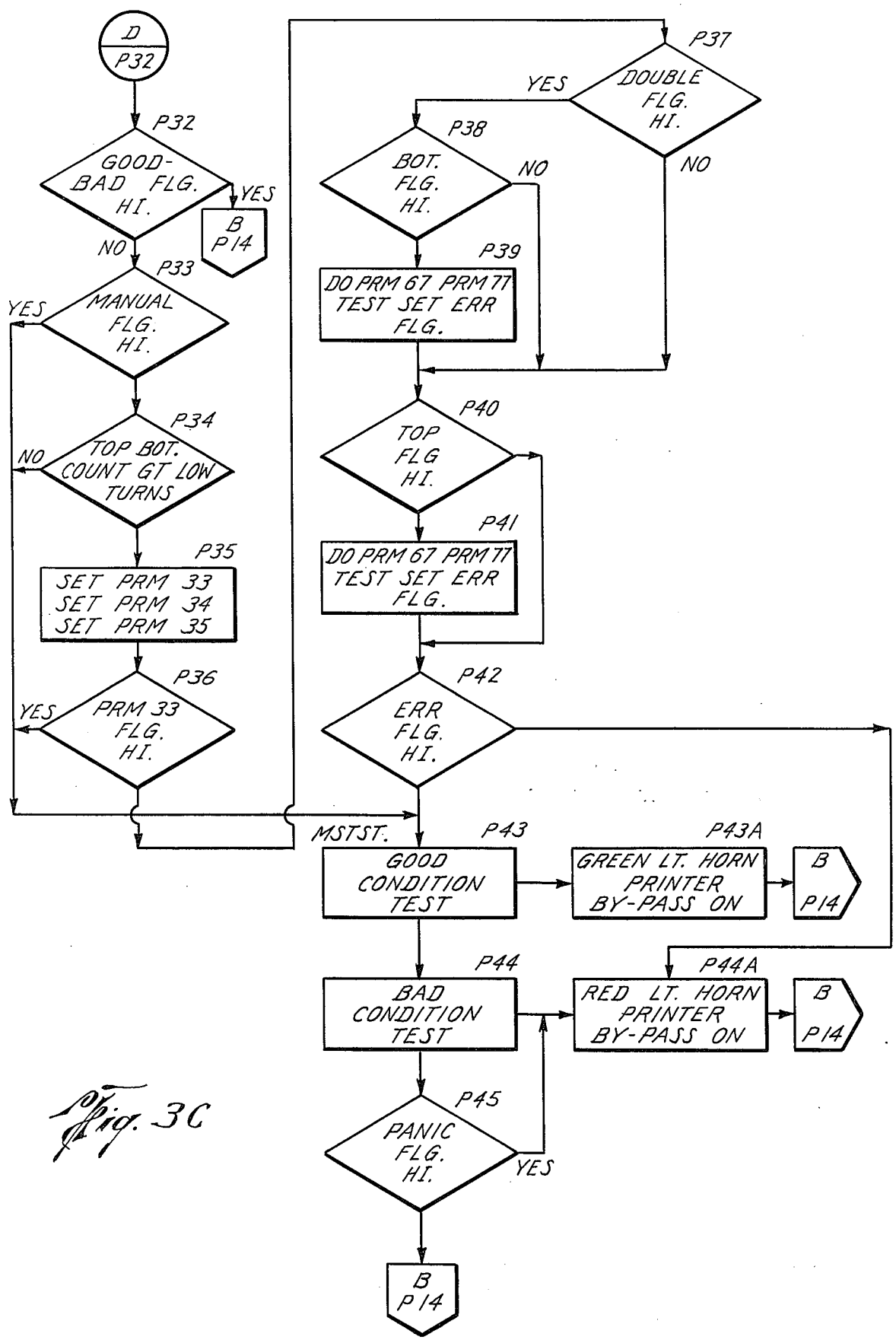

Referring now to FIGS. 3A, 3B and 3C, the control programs stored in the microprocessor 60 is best seen. Preferably, the microprocessor may be an RCA microprocessor model 1802. In step P1, the main program control is set to register one, in step P2, the entire system is reset, in step P3, RAM 62 is zeroed and the work registers are set. In step P4, the input data which is set in the hand switches 70, 72, 74, 76, 78 and 80 which includes reference torque, minimum torque, maximum torque, low turns, minimum turns, and maximum turns, are received. In step P5, the input data received in step P4, which is in binary coded decimal form, is converted to binary form and then in step P6 are stored in the RAM 64 for future tests.

In step P7, all received data is checked to determine if it is defective, and if so, the processor proceeds to step P8 and P9 and recycled and provides an indication of a bad joint to indicate a defect in the received data. On the other hand, if in step P7 the data received is numeric, the processor continues to step P10 by zeroing and blanking the displayed digits in displays 88, 90, 92 and 94. In step 11, the automatic testing is prepared for programming. Panel input switches 82, 84 and 86 have been manually actuated to indicate whether the automatic turns correction feature is to be used (ATC), whether the thread makeup is to be automatically terminated upon the indication of a failure prediction or merely sound an alarm (auto-manual), or to indicate whether or not a single threaded connection is to be made up, such as a threaded connection between pipe section 14 and the pipe coupling 16, or if a double threaded connection is to be made up between the pipe section 14, the coupling 16, and the lower pipe section 18 (single-double). The information from switches 82, 84 and 86 is then stored in RAM 64 which determines the mode of operation. Step P3 sets the displays and if good flag is off and bad flag is off, then display the last torque and turn values on the displays 88, 90, 82 and 94.

In step P14, if the measured torque is above or greater than the said reference torque, the set turns of the top and bottom counters are enabled in step P15 or otherwise the flag for clear turns is enabled.

If the measured torque is below reference torque and the reset switch 66 is off, the program is recycled. If the measured torque is below reference torque and the reset switch 66 is on, the program starts again at step P1. If the measured torque is below the reference torque and the turns correction switch 82 is enabled, then any accumulated measured turns are zeroed. If the measured torque is greater than the reference torque, the turns accumulation in step P15 is actuated and step P16 is actuated to start the recorder 96.

In steps P17, P18, P19, P20 and P21, the binary torque measurements, the binary top count measurement, and the binary bottom count measurement are converted to binary coded decimal display measurements and displayed in displays 88, 90, 92 and 94. In step P22, the measured torque is compared with the maximum set torque to determine if the measured torque is greater than the maximum torque, and if so, step P23 indicates this on display 94 and in step P24 turns the top and bottom counts and the recorder off.

Steps P25, P26, P27 and P28 relate to automatically correcting the turns count whenever the measured torque is less than the reference torque by zeroing the top and bottom measured count.

In steps P29, P30 and P31, if the measured torque is less than the reference torque, the program is recycled to step P2. However, if the measured torque is greater than the reference torque, the program continues to step P33 which is controlled by the auto-manual switch 84. When the manual switch is actuated the following test will only provide a visual and audible indication to the operator who then manually controls the continuation or stopping of the threaded makeup. If the auto position is selected, the following test will continue to automatically make up the joint or stop the makeup automatically depending upon the test results.

Step P34 compares the measured top and bottom counts with the set low turns to determine when the low turns parameter has been reached. Steps P35 through 44, test the measured torque and measured turn counts to insure that they are within the control parameters. A bad flag is indicated in the RAM 64, the bad lamp 97 and siren 93 are turned on, and the bypass valve 24 is actuated to stop the joint makeup when the following indications occur:

If the measured torque is less than $$\text{the minimum torque} \times \frac{\text{top turns}}{\text{max. turns}} - \text{reference torque},$$

If measured torque is less than $$\text{minimum torque} \times \frac{\text{bottom measured turns}}{\text{max. bottom turns}} - \text{reference torque},$$

If measured torque is greater than $$\text{maximum torque} \times \frac{\text{top measured turns}}{\text{min. top turns}} - \text{reference torque},$$

If measured torque is greater than $$\text{maximum torque} \times \frac{\text{bottom measured turns}}{\text{min. bottom turns}} - \text{reference torque,}$$

If measured torque is greater than the minimum torque and either the top turns is less than low top turns or bottom turns is less than low bottom turns, If either bottom measured turns are greater than maximum bottom turns or measured top turns are greater than maximum top turns, If measured torque is greater than maximum torque.

On the other hand, if the measured torque is less than minimum torque and the top measured turns are less than minimum top turns and the bottom measured turns are less than the minimum bottom turns, this is an indication that the threaded makeup is progressing satisfactorily, a good flag is set and the program recycles to step P14.

Assuming that the threading of the joint proceeds satisfactorily and does not indicate a failure, a good test condition will be indicated, the green light 95 and horn 91 will be indicated and the bypass valve 24 will be actuated to stop the joint makeup when the measured torque is greater than the minimum torque and both the measured bottom turns are greater than the minimum bottom turns and the measured top turns are greater than the minimum top turns. A print command is given to the recorder 96 to record and save all of the data set in the switches 70, 72, 74, 76, 78 and 80 and in the displays 88, 90, 92 and 94.

The present invention, therefore, is well adapted to carry out the objects and attain the ends and advantages mentioned as well as other inherent therein. While a presently preferred embodiment of the invention is given for the purpose of disclosure, numerous changes in the details of construction, arrangement of parts, and steps of the process will readily suggest themselves to those skilled in the art and which are encompassed within the spirit of the invention and the scope of the appended claims.

What is claimed is:

1. A method for making up two members having mating threaded ends comprising, threadedly interengaging said mating threaded ends until a predetermined reference torque is required to further threadedly interengage said mating threaded ends, thereafter futher threadedly interengaging said mating threaded ends, discontinuing said further threaded interengagement of said mating threaded ends when the torque required to further threadedly interengage said mating threaded ends is greater than $$N \left( \frac{\text{a predetermined maximum torque} - \text{reference torque}}{\text{predetermined minimum turns}} \right) + \text{reference torque}$$

or is less than $$N \left( \frac{\text{a predetermined minimum torque} - \text{reference torque}}{\text{predetermined maximum turns}} \right) + \text{reference torque}$$

where $N$ is the number of threaded turns.

2. A method for making up two members having mating threaded ends comprising:

theadedly interengaging said mating threaded ends while measuring the torque required to turn one of said members relative to the other member until a predetermined reference torque is reached, thereafter threadedly interengaging said mating threaded ends while counting the number of turns of said one member while continuing to measure said torque, discontinuing said further threaded interengagement of said mating ends when the torque required to further threadedly interengage said mating threaded ends is greater than $$N \left( \frac{\text{a predetermined maximum torque} - \text{reference torque}}{\text{predetermined minimum turns}} \right) + \text{reference torque}$$

or is less than $$N \left( \frac{\text{a predetermined minimum torque} - \text{reference torque}}{\text{predetermined maximum turns}} \right) + \text{reference torque}$$

where $N$ is the number of threaded turns.

3. The method of claim 2, including, removing the count of the number of turns if the measured torque becomes lower than the reference torque, and restarting the counting of the number of turns when the measured torque equals the reference torque.

4. A method for making up two members having mating threaded ends comprising, threadedly interengaging said mating threaded ends while measuring the torque required to turn one of said members relative to the other member until a predetermined reference torque is reached, thereafter threadedly interengaging said mating threaded ends while counting the number of turns of said one member while continuing to measure said torque, removing the count of the number of turns if the measured torque becomes lower than the reference torque, and resetting the counting of the number of turns when the measured torque equals the reference torque.

5. An apparatus for making up two members having mating theads comprising, means for rotating one member relative to the second member, means for measuring the torque required to make up the threaded connection, means for measuring the number of turns of rotation of one member relative to the second member, a processor for receiving the torque and turns measurements, means connected to the processor for inserting values of low, minimum and maximum turns, and reference, minimum, and maximum torque into said processor, said processor indicating that a makeup is proceeding to failure when the torque required to further threadedly interengage said mating threads is greater than $$N \left( \frac{\text{a predetermined maximum torque} - \text{reference torque}}{\text{predetermined minimum turns}} \right) + \text{reference}$$

or is less than $$N\left(\frac{\text{a predetermined minimum torque} - \text{reference torque}}{\text{predetermined maximum turns}}\right) + \text{reference torque}$$

where $N$ is the number of threaded turns.

6. The apparatus of claim 5 including, said processor including means for removing the count of the number of turns if the measured torque becomes lower than the reference torque, and means for restarting the counting of the number of turns when the measured torque equals the reference torque.

7. An apparatus for making up two members having mating threads comprising, means for rotating one member relative to the second member, means for measuring the torque required to make up the threaded connection, means for measuring the number of turns of rotation of one member relative to the second member, a processor for receiving the torque and turns measurements, means connected to the processor for inserting values of low, minimum and maximum turns, and reference, minimum, and maximum torque into said processor, said processor indicating that a makeup is proceeding to failure when the torque required to further threadedly interengage said mating threads exceeds certain predetermined parameters, said processor including means for removing the count of the number of turns if the measured torque becomes lower than the reference torque, and means for restarting the counting of the number of turns when the measured torque equals the reference torque.

* * * * *